(12) United States Patent
Sugihara

(10) Patent No.: US 8,191,976 B2
(45) Date of Patent: Jun. 5, 2012

(54) CORELESS RUBBER CRAWLER TRACK

(75) Inventor: Shingo Sugihara, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 646 days.

(21) Appl. No.: 12/299,206

(22) PCT Filed: May 2, 2007

(86) PCT No.: PCT/JP2007/059393
§ 371 (c)(1),
(2), (4) Date: Jan. 21, 2009

(87) PCT Pub. No.: WO2007/126116
PCT Pub. Date: Nov. 8, 2007

(65) Prior Publication Data
US 2009/0200863 A1    Aug. 13, 2009

(30) Foreign Application Priority Data
May 2, 2006    (JP) .................. 2006-128422

(51) Int. Cl.
*B62D 55/24*    (2006.01)
*F16G 1/00*    (2006.01)

(52) U.S. Cl. ........................... 305/167; 305/170

(58) Field of Classification Search .......... 305/165–167, 305/169–170
See application file for complete search history.

(56) References Cited

U.S. PATENT DOCUMENTS

| | | | | |
|---|---|---|---|---|
| 2,476,828 A | * | 7/1949 | Skromme | 305/170 |
| 3,212,627 A | * | 10/1965 | Beebee | 198/847 |
| 3,858,948 A | * | 1/1975 | Johnson et al. | 305/178 |
| 4,229,254 A | * | 10/1980 | Gill | 162/358.4 |
| 4,721,498 A | * | 1/1988 | Grob | 474/261 |
| 5,211,609 A | * | 5/1993 | Haines | 474/260 |
| 7,083,242 B2 | * | 8/2006 | Piou et al. | 305/167 |
| 7,114,788 B2 | * | 10/2006 | Deland et al. | 305/157 |
| 2003/0019133 A1 | | 1/2003 | Hori | |
| 2006/0232129 A1 | | 10/2006 | Fujita et al. | |

FOREIGN PATENT DOCUMENTS

| | | |
|---|---|---|
| JP | 06032262 A * | 2/1994 |
| JP | 2001-10556 A | 1/2001 |
| JP | 2002-178965 A | 6/2002 |
| JP | 2002-264854 A | 9/2002 |
| JP | 2003-34276 A | 2/2003 |
| WO | 2004/106148 A1 | 12/2004 |

* cited by examiner

*Primary Examiner* — Jason Bellinger
(74) *Attorney, Agent, or Firm* — Sughrue Mion, PLLC

(57) ABSTRACT

A coreless rubber crawler track has an endless rubber elastic body (1), steel cords (3) embedded in the longitudinal direction of the elastic body, rubber protrusions (2) formed at a constant interval from the inner peripheral surface toward the longitudinal direction of the elastic body, and rubber lugs formed on the outer peripheral surface. Bias cords (5, 6) are arranged on the outer peripheral side of the steel cords (3) so as to extend to the lateral right and left in the directions opposite from each other. Both bias cords (5, 6) are overlapped on each other over a width of 10 mm or more directly under the rubber protrusions. With such an arrangement, torsional rigidity and lateral rigidity of the rubber crawler track are improved and, even when the rubber crawler track is passed over sprockets etc., bending rigidity is not high and a tooth skip phenomenon is suppressed.

8 Claims, 4 Drawing Sheets

CORELESS RUBBER CRAWLER TRACK

TECHNICAL FIELD

The present invention relates to improvement of a coreless rubber crawler (hereinafter, referred to simply as "rubber crawler"). Particularly, the invention has an object to provide a rubber crawler having improved torsional rigidity and lateral rigidity.

BACKGROUND ART

The torsional resistance and lateral rigidity of a rubber crawler have great effect on the wheel detachment prevention performance (coming-off preventing performance) and durability. However, the circumferential rigidity of the rubber crawler is increased simultaneously, and such increased bending rigidity presents a significant problem for a moving device.

The technique for improving the torsional resistance and lateral rigidity is shown in the patent document 1, which discloses a structure having, in addition to main cords, two bias cord plies embedded extending toward opposite sides in a lateral directions as reinforcing layers and layered one over the other. When such a rubber crawler is used, the torsional rigidity and the lateral rigidity become favorable to achieve excellent wheel detachment prevention performance (coming-off preventing performance) and durability. However, at the same time, the rigidity in the circumferential direction becomes larger, and the crawler does not get wound around the sprocket and rotates loosely, which may ultimately cause a problem of larger power loss in a machine to which the rubber crawler is mounted. Further, when the rubber crawler is wound around the sprocket, the trailing performance with respect to the sprocket is lost, which causes tooth jumping (tooth skip phenomenon) and finally breaking of driving projection.

Meanwhile, there has been proposed a rubber crawler having laterally mutually-opposite bias cords butt-jointed to each other as reinforcing layer in order to achieve excellent torsional rigidity and lateral rigidity of the coreless rubber crawler (see Patent document 2). However, in this state, it is difficult to achieve enough high lateral rigidity of the crawler and the rubber crawler may be buckled laterally.

Patent document 1: Japanese Patent Application Laid-Open (JP-A) No. 2002-178965

Patent document 2: Japanese Patent Application Laid-Open (JP-A) No. 2001-010556

SUMMARY OF THE INVENTION

Problem to be Solved by the Invention

The present invention has an object to provide a rubber crawler which has improved torsional rigidity and lateral rigidity and is advantageously used as a moving device.

Means for Solving the Problem

A first aspect of the present invention is a coreless rubber crawler including: an endless rubber elastic body; steel cords embedded in a longitudinal direction of the rubber elastic body; rubber projections formed at fixed intervals in the longitudinal direction at an inner surface of the coreless rubber crawler; and a rubber lug formed at an outer surface of the coreless rubber crawler, wherein bias cords are arranged mutually extending toward opposite sides in a lateral direction at respective lateral sides of the coreless rubber crawler, respective parts of the bias cords being layered one over another immediately beneath the rubber projections to define a layered part, and the layered part covers a central part in a lateral direction of the rubber projections and parts at either side thereof.

In the above-described aspect, a large number of bias cords are embedded in both lateral sides of the coreless rubber crawler, mutually extending toward opposite sides in a lateral direction (in the mutually opposite directions), and the bias cords are inclined relative to the circumferential direction of the coreless rubber crawler. In other words, the right bias cords positioned on the right side and the left bias cords positioned on the left side are inclined in mutually opposite directions (inverse directions). As the rubber projections are formed to cover from the center part of the rubber crawler to the both lateral sides, it is possible to strike a balance of the rigidity between the both lateral sides of the rubber projections, and this makes it possible to prevent occurrence of tooth jumping and coming-off of the wheels.

The bias cords may be embedded in a radially outside of the steel cords embedded in the rubber elastic body. Further, the bias cords may be arranged separate from the steel cords. The bias cords which compose the layered part may be embedded in a position (depth) different from the position of the bias cords of the part other than the layered part.

In addition, the bias cords of both sides mutually extending toward opposite sides in a lateral direction which compose the layered part may be embedded at separate positions in a thickness direction of the rubber elastic body. Further, the bias cords at the part other than the layered part may be embedded at the position (depth) between the bias cords of both sides mutually extending toward opposite sides in a lateral direction which configure the layered part in the thickness direction of the rubber elastic body.

The layered part may be formed over the whole width of the rubber projections, and further, may extend close to a part corresponding to the inner end of the outer surface of a wheel on which the coreless rubber crawler is wound (contact part inner end with the rolling wheel). With this structure, it is possible to prevent the bias cords from being bent at end of the layered part and from being cut off due to fatigue.

Further, in order to prevent buckling of the bias cords, the layered part may be formed over 20% or more of the width of the rubber projections. When the width of the rubber projections is less than 20%, enough effects cannot be obtained and there may occur buckling.

The layered part may be formed with a right-positioned layered part and a left-positioned layered part having a width ratio ranging from 2:1 to 1:2 relative to the laterally center part of the rubber projections. If the width ratio is outside such a range and the layered part is formed with an imbalance toward one or other side, the bias cords may be bent and cut off due to fatigue. Further, the laterally center part of the layered part may be formed corresponding to the laterally center part of the rubber projections in the lateral direction of the coreless rubber crawler.

Further, each of the above-mentioned rubber projections may have a side wall surface inclined radially and jut from the inner surface of the rubber elastic body, and the side wall surface may be formed in parallel with a surface of a wheel on which the coreless rubber crawler is wound, the surface facing the side wall surface. In this case, as the inclination angle of the projections is parallel with the sprocket, a frictional force is increased thereby suppressing tooth jumping.

Plural projections may be arranged laterally on the inner surface of the rubber elastic body. In this case, the layered part may be formed immediately beneath the projections positioned at the center.

Effect of the Invention

The present invention is structured as described above. With this structure, such a rubber crawler is attained that the torsional rigidity and lateral rigidity of the rubber crawler are improved, when the rubber crawler is used in a state wound around the sprocket or the like as a moving device, the bending rigidity is not so high and designed winding is obtained, and little tooth jumping occurs.

BEST MODE FOR CARRYING OUT THE INVENTION

According to the present invention, in order to suppress the bending rigidity of a rubber crawler, the rubber crawler has bias cords extending toward opposite sides in a lateral direction (in laterally opposite directions) at respective lateral sides thereof, which are embedded in the same horizontal position in a rubber elastic body and layered one over another along the longitudinal direction at the center part thereof. This layered part corresponds to a part immediately beneath rubber projections formed on the inner surface of the rubber crawler. This part is hardly subjected to the tread action of rolling wheels and is relatively stable. As it is positioned in the center part of the rubber crawler, failures such as torsion (twisting) at this part are not likely to occur.

The width of this superimposition depends on the sizes of the rubber crawler and the rubber projection, and 10 nm is a sufficient length. The layered part has an end that may extend beyond the laterally outer face of each rubber projection, but preferably, its width is limited within a length at which rolling wheels rolling laterally outside the rubber projection contact thereto.

The bias angle of the bias cord may be selected appropriately depending on the size of the rubber crawler, the size of sprocket (curvature), external force to be applied laterally and the like. However, it is generally about 10 to 45 degrees, or preferably, 30 to 40 degrees, with respect to the width direction of the rubber crawler. Here, the bias cord may be made of steel cords or any other synthesized fibers such as nylon, polyester or the like.

The bias cords may be embedded at the inner surface side or outer surface side of the steel cords, but generally the bias cords are embedded at the outer surface side.

In addition, it is generally preferable that the diameter of each bias cord is smaller (finer) than the diameter of the steel cord (main cord) embedded in the longitudinal direction of the rubber elastic body. As an experimental manufacture, the diameter of the bias cord is 0.9 mm and the diameter of the steel cord (main cord) is 3.2 mm. The steel cord (main cord) needs sufficient cord diameter to achieve enough breaking strength, while if the bias cord is made having the same cord diameter as that of the steel cord, such size gives the bias cord too much bending rigidity and decreases the trailing performance, which may cause phenomena of detachment of wheels, tooth jumping and the like.

Examples

Figure 1:
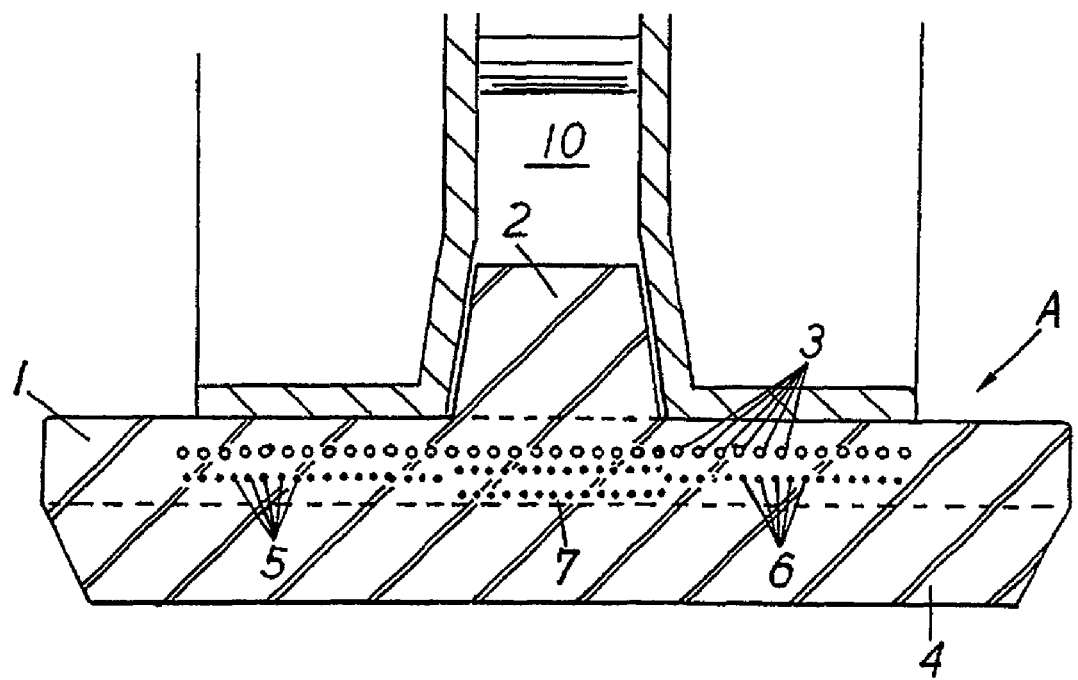
FIG. 1 is a laterally cross sectional view of a rubber crawler of the present invention.
Figure 2:
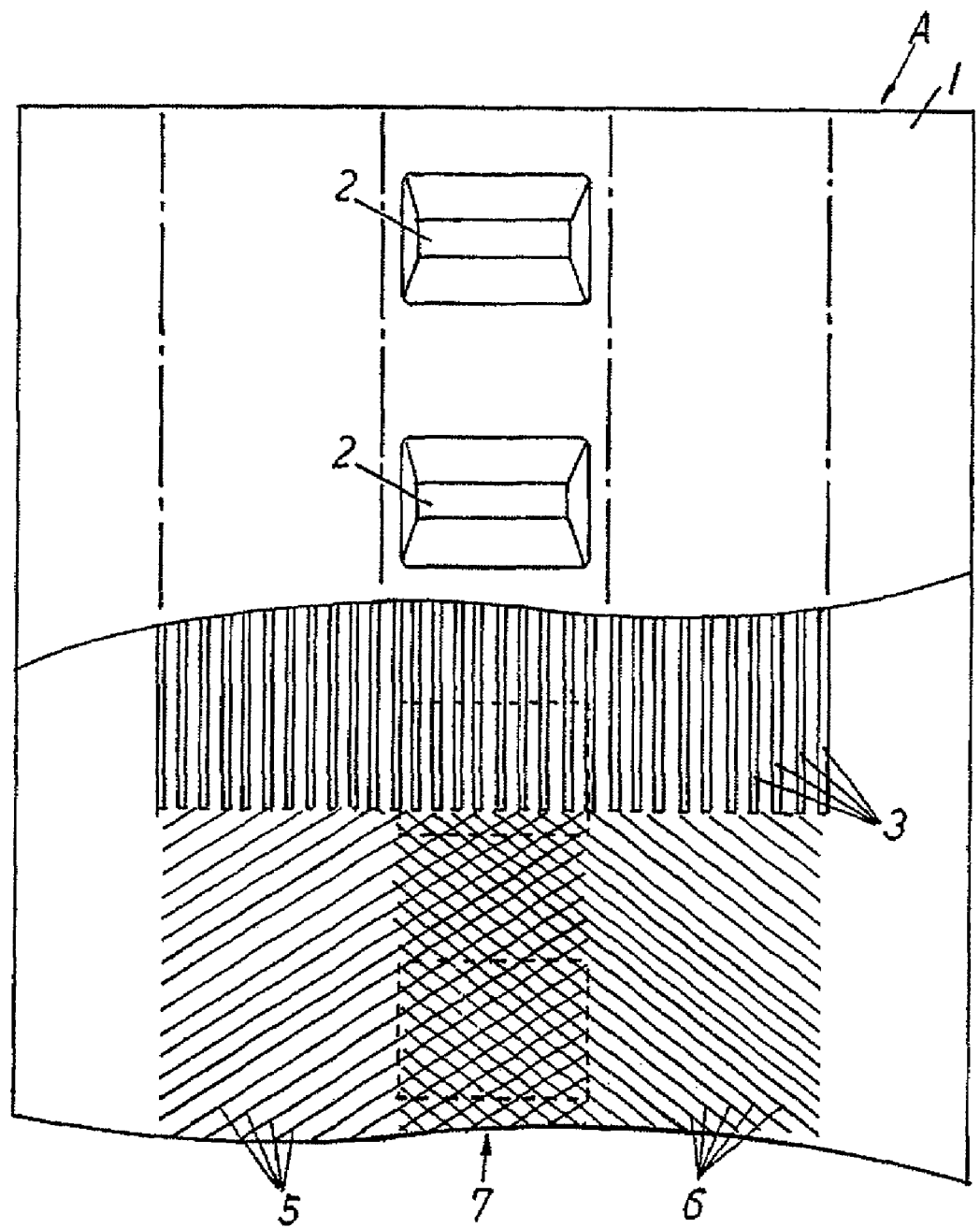
FIG. 2 is a partially-cut plane view of the rubber crawler of FIG. 1.

Description below is given about more details of the present invention with reference to the drawings. FIG. 1 is a laterally cross sectional view of a rubber crawler A of the invention and FIG. 2 is a partially-cut plane view thereof. The reference numeral 1 denotes a rubber elastic body which is a base body of the rubber crawler A, and it is continuous vertically as shown in FIG. 2. The reference numeral 2 denotes each of rubber projections formed at given pitch at the center part of the inner surface of the rubber elastic body 1. The rubber projections engage a sprocket (not shown) to transfer a driving force. The reference numeral 3 denotes each of steel cords as tensile reinforcing members, which are embedded in the longitudinal direction of the rubber elastic body 1. The reference numeral 4 denotes a rubber lug formed on the outer surface of the rubber elastic body 1.

Here, the reference numerals 5, 6 denote bias cords made of steel cord fibers embedded at the outer surface side of the steel cords 3 and the bias cords are embedded having an angle of 38 degrees relative to the width direction. The reference numeral 7 denotes a layered part where center-side edges of the bias cords 5 and 6 are layered and this layered part is immediately beneath the rubber projections 2. Generally, the layered part is structured not to reach the rolling parts of the rolling wheels 10 rolling on the both side surfaces of the rubber projections 2.

The actual rubber crawler A is structured such that, when the rubber crawler A has a width of 450 mm, the widths of the respective bias cords (angle of 38 degrees) 5, 6 are 250 mm and the superimposition width of the layered part 7 is 50 mm. Here, the lateral width of each of the rubber projections formed on the inner surface is 60 mm.

Figure 3:
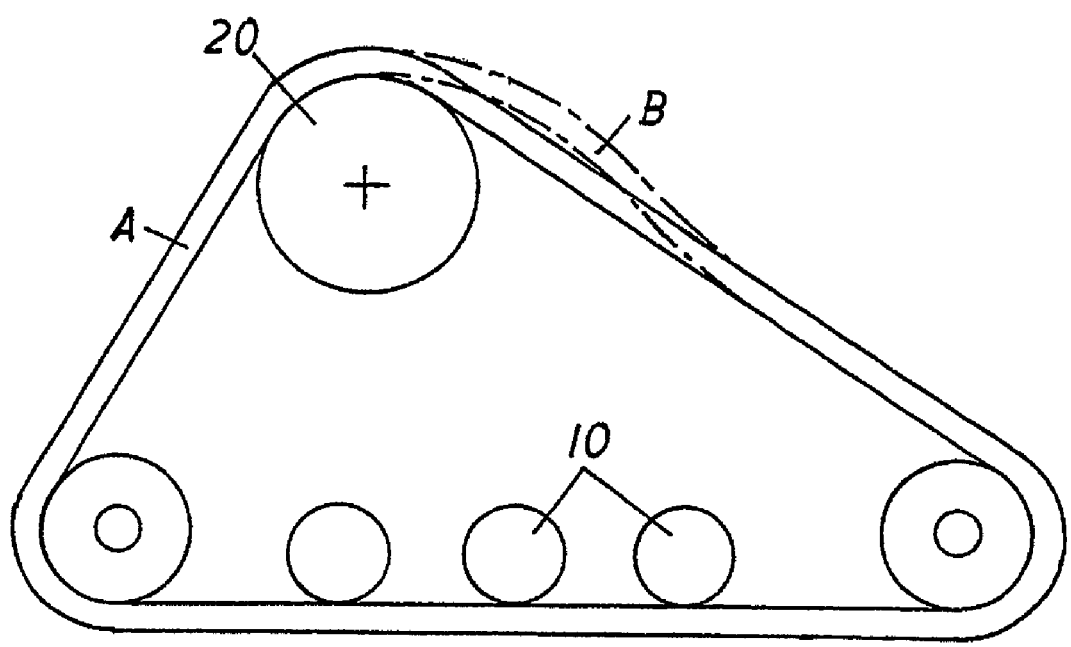
FIG. 3 is a side view of the rubber crawler of the invention wound on the sprocket.

FIG. 3 is a side view of the of the rubber crawler A wound on the sprocket 20. The rubber crawler A of the invention has low bending rigidity and is wound on the sprocket 20 as designed (which is indicated by the solid line), while the rubber crawler B disclosed in the patent document 1 has high bending rigidity and is wound on the sprocket 20 loosely floating thereover (which is indicated by the dashed line), and there often occur phenomena of detachment (coming-off) of the wheels and tooth jumping. Thus, the rubber crawler A of the invention is wound on the sprocket as designed and is superior to the conventional rubber crawler B in this regard, there occurs extremely few tooth jumping phenomena between the sprocket 20 and the rubber crawler A, and rubber cracking or the like of the rubber crawler A, particularly of the rubber projections 2 thereof rarely occurs.

The table 1 below shows performance comparison of the example of the invention, comparative examples 1, 2 and 3 as to the wheel detachment (coming-off) prevention (torsional rigidity), lateral rigidity (buckling rigidity) and bending rigidity (trailing performance). Here, the comparative example 1 is a rubber crawler having bias cords at laterally opposite sides layered one over another over the entire width of the rubber crawler, the comparative example 2 is a rubber crawler having bias cords at laterally opposite sides that meet and are opposed at a central portion, and the comparative example 3 is a rubber crawler having bias cords layered only at one side of the rubber projections.

| | Wheel detachment prevention performance (torsional rigidity) | Lateral rigidity (buckling rigidity) | Bending rigidity (trailing performance) |
|---|---|---|---|
| Example | Unlikely to be detached | Non-buckling | Trails |
| Comparative example 1 | Unlikely to be detached | Non-buckling | Unlikely to trail |
| Comparative example 2 | Unlikely to be detached | Buckling occurs | Trails |
| Comparative example 3 | Likely to be detached | Non-buckling | Trails |

This result exhibits that as the comparative example 3 has the layered part, it is unlikely to be buckled, however, is likely to come off due to disbalance of the rigidity.

Figure 4:
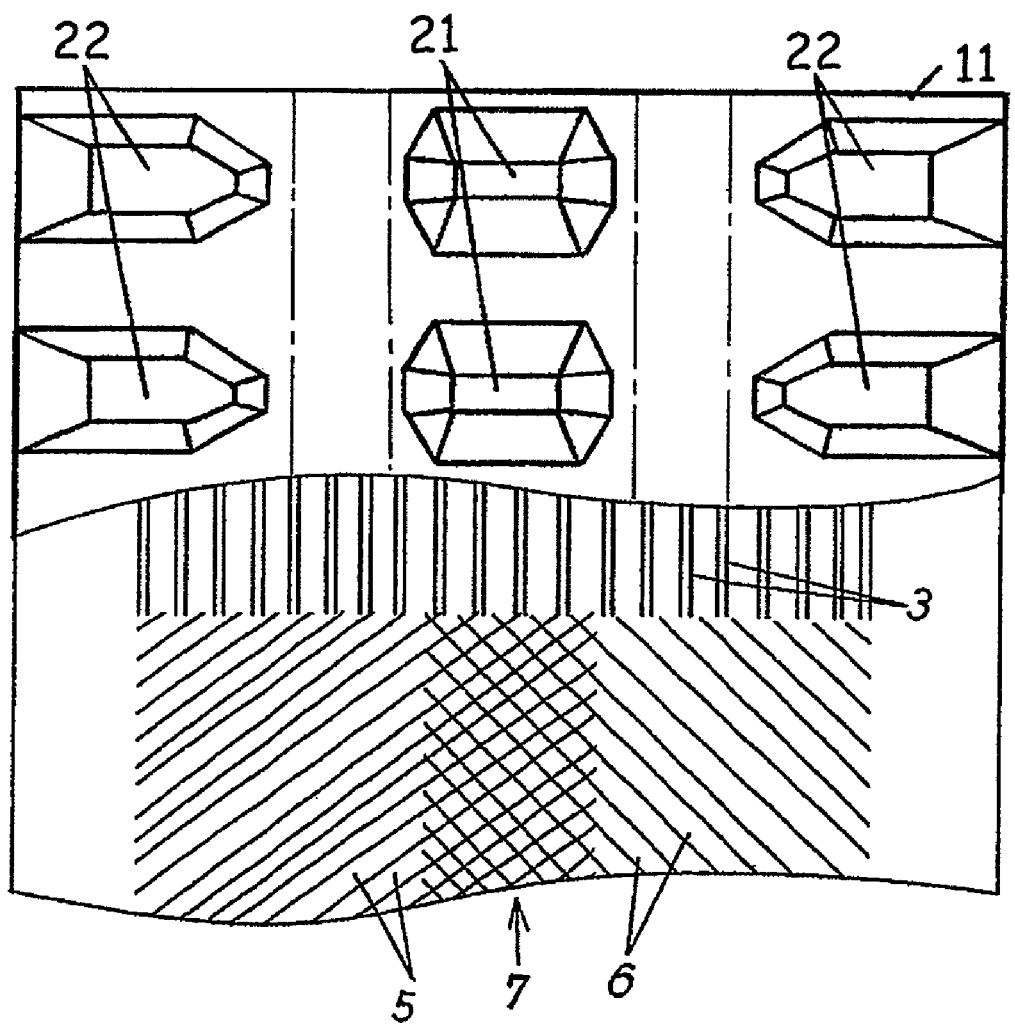
FIG. 4 is a partially-cut plane view of a second non-limiting embodiment of the rubber crawler of the invention in which three rubber projections are formed laterally.

The invention is applicable to a rubber crawler having rubber projections formed laterally at plural parts of the inner surface of the rubber elastic body. FIG. 4 shows a second non-limiting embodiment of a rubber crawler having three rubber projections 21 and 22 formed laterally on the inner surface of the rubber elastic body 11. In this case, the layered part 7 is formed immediately beneath the center rubber projections 21.

INDUSTRIAL APPLICABILITY

As described up to this point, the present invention provides a rubber crawler which has improved torsional rigidity and lateral rigidity and is capable of preventing occurrence of tooth jumping as a moving device. The present invention is widely used in a coreless rubber crawler.

EXPLANATION OF REFERENCE NUMERALS 1 rubber elastic body
2 rubber projection
3 steel cord
4 rubber lug
5, 6 bias cord
7 layered part of bias cords
10 rolling wheel
20 sprocket
A rubber crawler of the invention
B conventional rubber crawler

The invention claimed is:

1. A coreless rubber crawler comprising:
an endless rubber elastic body;
steel cords embedded in a longitudinal direction of the rubber elastic body;
rubber projections formed at fixed intervals in the longitudinal direction at an inner surface of the coreless rubber crawler; and
a rubber lug formed at an outer surface of the coreless rubber crawler, wherein bias cords are arranged mutually extending toward opposite sides in a lateral direction at respective lateral sides of the coreless rubber crawler, respective parts of the bias cords being layered one over another immediately beneath the rubber projections to define a layered part, and the layered part covers a central part in a lateral direction of the rubber projections and parts at either side thereof,
wherein the rubber projections are positioned at a central part in a lateral direction of the coreless rubber crawler, and
wherein the layered part extends in the lateral direction, and a lateral width of the layered part is smaller than a lateral width of the rubber projections.

2. The coreless rubber crawler of claim 1, wherein the bias cords extend inclined relative to a circumferential direction of the coreless rubber crawler.

3. The coreless rubber crawler of claim 1, wherein the bias cords are embedded in the rubber elastic body at a radially outer side of the steel cords embedded therein.

4. The coreless rubber crawler of claim 1, wherein the lateral width of the layered part is 20% or more of the lateral width of the rubber projections.

5. The coreless rubber crawler of claim 1, wherein a central position in the lateral direction of the layered part corresponds to the central part of the rubber projections in the lateral direction of the coreless rubber crawler.

6. The coreless rubber crawler of claim 1, wherein each of the rubber projections has a side wall surface inclined radially and protrudes from the inner surface, and the side wall surface is formed in parallel with a surface of a wheel on which the coreless rubber crawler is wound, the surface facing the side wall surface.

7. The coreless rubber crawler of claim 1, wherein the bias cords mutually extending toward opposite sides in the lateral direction which form the layered part are embedded at a separated position in a thickness direction of the rubber elastic body.

8. The coreless rubber crawler of claim 1, wherein a diameter of the bias cords is smaller than a diameter of the steel cords.

* * * * *